Sept. 23, 1969 N. P. KOZLENKO ET AL 3,469,187
RANDOM SIGNAL LEVEL METER
Filed Dec. 6, 1966

United States Patent Office 3,469,187
Patented Sept. 23, 1969

3,469,187
RANDOM SIGNAL LEVEL METER
Nikolai Panteleimonovich Kozlenko, Starosadsky per. 8, kv. 16, and Zoya Nikolaevna Rezvyakova, Ulitsa Kirova 22, kv. 14, both of Moscow, U.S.S.R.
Filed Dec. 6, 1966, Ser. No. 599,417
Int. Cl. G01r 27/02
U.S. Cl. 324—77    4 Claims

ABSTRACT OF THE DISCLOSURE

A meter for measuring the level of a random signal such as a light or sound signal comprises a transducer for converting the signal to be measured into an electrical signal, said transducer being connected to a voltmeter having integrators with different time characteristics connected in groups with parallel connected inputs, the input of each group being connected to a rectifier interposed between the transducer and the group and the output of each integrator being connected to an adder.

---

This invention relates to instruments for measuring the level of a random signal (or a noise) the time characteristic of which corresponds to a necessary arbitrary criterion, for instance, the time property of hearing, vision or of any apparatus.

Known random signal level meters comprise the following series-connected components: a rectifier, an integrator, and an indicator which when it is necessary, is replaced, by a recorder or by an automatic control. In these meters the time characteristic of the integrator, which in most cases is an RC-filter at the rectifier output, is determined by a single parameter which is the time constant α of the exponent.

However, there are some time characteristics, for example the time property of hearing, which cannot be derived at any value of α. This limits the range of the signals to be measured.

An object of the present invention is to eliminate the above-mentioned disadvantages.

Another object of the invention is to provide a random signal level meter having a time characteristic with an arbitrary shape, corresponding to the time characteristic of any process being measured, and at the same time securing the conformity of the measured values with the selected criterion (including subjective estimation of the level being measured) and providing a higher accuracy of measurements.

With the above and other objects in view the invention is embodied in a random signal level meter comprising a transducer for converting a signal being measured into an electrical signal, a voltmeter connected to the output of the converter and comprising integrators with different time characteristics coupled in groups with parallel-connected inputs, each of these groups including at least one integrator, a plurality of rectifiers each of which is connected to the input of each group, and an adder connected to the outputs of the integrators and to the input of the indicator.

The integrators can be connected to the adder through elements changing the value of the output signal.

The rectifiers can be connected to the inputs of the integrator groups through D.C. amplifiers.

The invention will be illustrated hereinafter by the description of exemplary embodiments thereof with reference to the accompanying drawing, in which.

The random signal level meter comprises a transducer for converting a signal being measured into an electrical signal and is constituted by a microphone 1 and a voltmeter 2 connected to its output and used for rectifying and integrating the signal which is then fed to the indicator 3. Before applying the electrical signal to the voltmeter 2 it can be accordingly sent through a transformer, attenuator, amplifier, etc. for additional transformation.

An electronic controller may be used instead of the indicator 3.

The input 4 is provided for measuring the electric signal.

Figure 2:
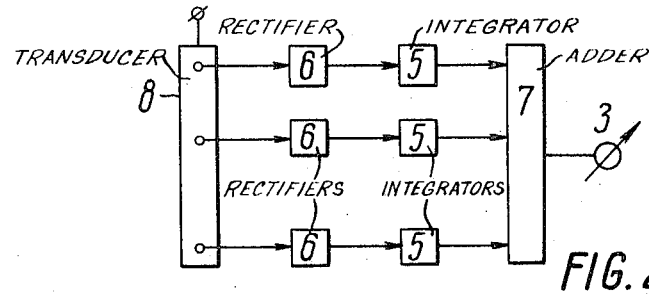
FIGS. 2 and 3 show simplified block diagrams of the versions of the voltmeter used in this meter.

The voltmeter 2 incorporates integrators 5 (FIG. 2) having different time constants α and operating simultaneously. The input of each integrator is provided with a separate rectifier 6. The outputs of the integrators are coupled with a common adder 7 connected to the indicator 3.

It is advisable to use the above voltmeter either in case when the converter 8 has a multichannel output (for example, a delay line with taps), or when using integrators with low input impedance with the rectifier diodes featuring considerable forward resistance. In the latter case paralleling the inputs of all integrators and connection of a single rectifier to their common input result in an undesirable increase of the integrator capacitance charge time depending on the absolute signal level. This is due to an increase in the forward resistance of the rectifier diodes at low signal levels. If the converter 8 is omitted the inputs of the rectifiers 6 may be connected in parallel.

The signals fed from the integrators 5 are added in the common adder 7 for obtaining different time characteristics at its output.

Figure 3:
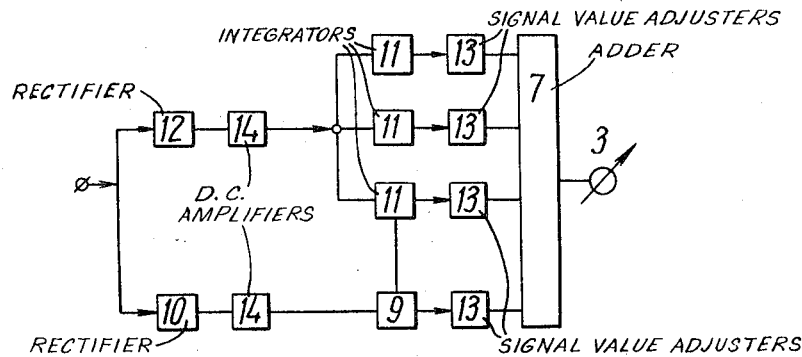

In the voltmeter shown in FIG. 3 the integrator 9 is connected to an individual rectifier 10. The inputs of integrators 11 are connected in parallel in a group and connected to a common rectifier 12. The integrators are connected to the adder 7 through elements 13 for changing the respective values of the signals fed to the adder. Any change of the value of the signal varies the shapes of the time characteristics.

When connecting the inputs of the integrators 11 in parallel the input impedance of the group may be too low which causes the above-mentioned disadvantages and hence makes is necessary to limit the number of the integrators in the group.

This shortcoming may be eliminated by insertion of D.C. amplifiers 14, for example emitter followers with a balanced direct component, between the integrators 11 and 9 and the rectifiers 10 and 12.

Figure 4:
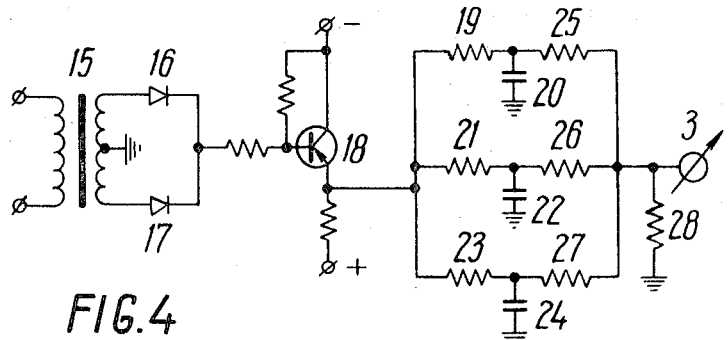
FIG. 4 is a circuit diagram of the voltmeter.
Figure 1:
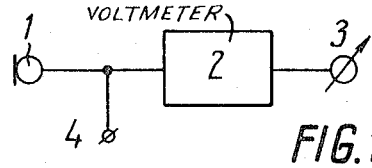
FIG. 1 shows a block diagram of the random signal level meter according to the present invention.

The circuit diagram of a version of the voltmeter is shown in FIG. 4.

The signal through a transformer 15 is applied to the full-wave rectifier employing diodes 16 and 17.

The rectified voltage through the emitter follower, built around a transistor 18 and fed from a power supply, balanced relative to the ground, is applied to the parallel connected inputs of three integrators or RC-circuits 19, 20; 21, 22; and 23,24. The time constants of the RC-circuits are different. The outputs of the RC-circuits through resistors 25, 26 and 27, changing the value of the output signals, are connected to the common resistor 28 on which these signals are added and the result is fed to the indicator 3.

The above-described random signal level meter can be used not only for measurement of useful signals but also for measuring random, regular and periodic interference.

The measurement may be carried out with a necessary or arbitrary time characteristic.

In particular, when applying the known methods for the frequency weighing of a value being measured, for example by means of a psophometric filter, the above-described meter can be used for quasi-subjective measurement (automatic control) of the signals such as sound (noise) level, light brightness, biological perception of vibrations, heat, etc.

What is claimed is:

1. A meter for measuring the level of a random signal comprising a transducer for converting a signal being measured into an electrical signal; and a voltmeter including integrators with different time characteristics connected in groups with parallel connected inputs, a rectifier connected to the input of each said group and to said transducer, and an adder connected to the integrators at the outputs thereof.

2. A meter as claimed in claim 1 comprising means connected between the adder and the output of each integrator for changing the value of the signal fed from each integrator to said adder.

3. A meter as claimed in claim 2 comprising direct current amplifiers connected between said integrators and said rectifiers.

4. A meter as claimed in claim 2, wherein said means connected between the adder and the output of each integrator comprises resistors.

References Cited

UNITED STATES PATENTS

| | | | |
|---|---|---|---|
| 3,201,704 | 8/1965 | Lindsey | 328—150 |
| 3,230,462 | 1/1966 | Kohl | 328—150 |

OTHER REFERENCES

P. G. Peterson, "The Measurement of Impact Noise," The General Radio Experimenter, February 1956, pp. 1–7.

RUDOLPH V. ROLINEC, Primary Examiner

A. E. SMITH, Assistant Examiner

U.S. Cl. X.R.

179—1; 324—140; 328—150